April 20, 1965 J. J. STONE, JR 3,179,745
FACSIMILE SCAN COMBINER SYSTEM
Filed March 28, 1960
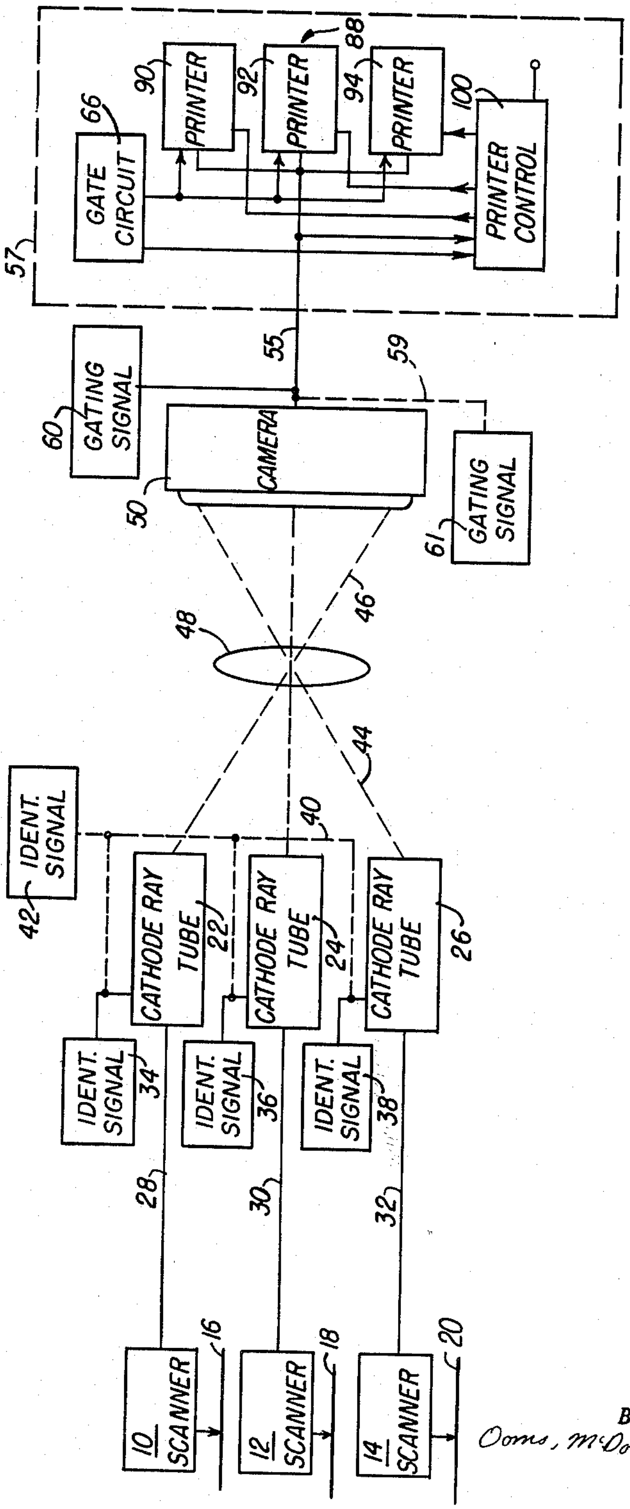
INVENTOR.
Joseph James Stone Jr.
BY
Ooms, McDougall, Williams & Hersh
Attys.

3,179,745
Patented Apr. 20, 1965

3,179,745

FACSIMILE SCAN COMBINER SYSTEM

Joseph James Stone, Jr., Glenview, Ill., assignor to A. B. Dick Company, Niles, Ill., a corporation of Illinois Filed Mar. 28, 1960, Ser. No. 18,023
3 Claims. (Cl. 178—6.8)

This invention relates in general to an improved facsimile arrangement and more particularly to an arrangement for transmitting a plurality of images from separate locations to respective remote recorders or printers.

In brief, the invention is characterized by an arrangement in which separate objects located at respective positions are conventionally scanned and their images reproduced at distant recorders without the necessity of synchronizing the initial scanning sequence with respect to each other or the recorder sequence. Thus each object after being initially scanned is reproduced on the screen of a respective cathode ray tube or similar device. The images are optically projected upon the screen of a video camera or similar arrangement which scans each image for reproducing the same as corresponding electrical signals which are transmitted together with identification signals over a wide band channel to a receiving station. The identifying character transmitted with each image serves to trip or advance a counting circuit or gate circuit which in turn activates a printer individual to each object to permit reproduction of an image of that object as its corresponding signals are received.

In this arrangement it will be noted that signals representing respective objects at many stations are transmitted over a single channel and that neither the rate at which the objects are scanned or the rate at which the video or television camera, for example, operates need be synchronized with respect to each other.

It is, therefore, an object of this invention to provide an improved facsimile transmission system.

It is another object of the present invention to provide a facsimile transmission system in which a plurality of images may be transmitted over a common channel.

It is another object of this invention to provide a facsimile transmission system in which a plurality of objects are scanned at respective positions and their images transmitted to respective remote recording stations.

It is another object of this invention to permit the transmission of a sequence of signals representing respective objects without the necessity of synchronizing the scanning of the objects with the signal transmission or sequence.

Other objects, features and advantages of this invention will become apparent on examination of the following specification and claims in conjunction with the drawing.

The drawing illustrates in block diagram the arrangement of the components, each of which is well known, for practicing the invention.

Referring now to the drawing wherein the system incorporating the principles of the present invention is shown, there will be seen respective blocks 10, 12 and 14 representing respective scanners of any well known type. Each is located at a respective station 16, 18 and 20 for scanning objects located at those stations.

Connected to each scanner via respective channels 28, 30 and 32 is an individually associated cathode ray tube or similar arrangement indicated by blocks marked 22, 24 and 26 for reproducing an optical image of the respective objects at the stations 16, 18 and 20. These images may be reproduced a line at a time and each may be assigned a coded identifying signal by the apparatus indicated by blocks 34, 36 and 38, if desired. This apparatus may comprises, for example, any well known type of counter or gate and signal arrangement whose operation is synchronized with the scanning process of each cathode ray tube for introducing the proper signal at the respective tubes.

An alternative arrangement is indicated by the dashed lines and the box marked 42 which may likewise comprise a plurality of gates, each triggered by a signal individual to the respective tube 22, 24 and 26 for returning thereto an identifying signal.

Either arrangement may, of course, be controlled by appropriate gating pulses for introducing the identifying signal at the proper interval.

Each image produced at the tubes is appropriately focused by an optical system as indicated by dashed lines 44 and 46, and lens 48 on the screen of a light responsive device such as a vidicon camera tube indicated at 50.

This type of apparatus integrates the light falling on its photosensitive surface and each scan is made to destroy the previous image. Signals representing the respective objects are now transmitted over the channel indicated at 55 to a control receiving station 57 where they are distributed to respective printers.

An identifying signal for each transmitting station 16, 18 and 20 may be assigned at this point by apparatus indicated by dashed line 59 and block 61 whose operation is synchronized with the operation of tube 50 in any well known manner and the respective signals representing the respective objects time multiplexed over channel 55.

Thus by providing gating signals as indicated by boxes 60 or 61, the signals from the camera may be sampled in a time period individually assigned thereto and simply directed to an appropriate printer group such as 88 at station 57 by a gate circuit such as indicated at 66 for activating the respective printers in a corresponding time period.

The printer group 88 comprises a printer 90, 92 and 94 individual to each of the transmitting stations 16, 18 and 20 and a printer controller indicated at 100. The printer controller comprises a simple gating or counter circuit which is activated responsive to the identifying signals for activating each of the printers 90, 92 and 94 so that each can respond in turn to incoming signals from a station, which has been assigned that time period at some point in the transmission process.

In the arrangement scanners 10, 12 and 14, being at different remote transmitting locations, scan respective objects to control respective cathode ray tube 22, 24 and 26 located at a common point to display a respective image of the objects. The lens 48 focuses the respective images on the vidicon camera tube indicated at 50. The tube 50 reproduces the images as respective electrical signals which may together with signals from other scanners and/or appropriate identification signals be time multiplexed over channel 55 to receiving station 57.

The appropriate printer group 88 is activated in the appropriate time periods and the identifying signals control the printer control 100 to activate each of the respective printers or recorders 90, 92 and 94 to record signals from each of the respective stations 20, 18 and 16.

In accordance with the above, there has been shown and described herein a novel, useful and simple arrangement for improving the operation of a scanning system which may be used for control of an electrostatic writing tube, but the particular embodiments or forms of the invention described herein are not limitations upon other manners of practicing the invention.

I claim:

1. A facsimile transmission system comprising a scanner arrangement for independently reproducing a respective image at one common location of respective objects located at other respective remote locations, a photo responsive arrangement at said one location for reproducing an electrical signal for each object, means for identifying each signal, a plurality of recorders located at a distant station, and a common transmission channel for transmitting each signal to said recorders for reproducing respective ones of said objects, said scanner arrangement comprising a plurality of cathode ray tubes at said location each reproducing a light image of a respective object and said photo responsive means comprising means for scanning each image, the identification of each signal being produced by a light image at each tube.

2. In the system claimed in claim 1, means for assigning a time period individual to each signal and each recorder whereby said signals are transmitted over said common channel.

3. In the system claimed in claim 1 means of controlling each recorder responsive to said identification for recording an individually corresponding object.

References Cited by the Examiner

UNITED STATES PATENTS

| | | | |
|---|---|---|---|
| 2,191,565 | 2/40 | Henroteau | 179—15 |
| 2,207,716 | 7/40 | Bumstead | 178—6.8 |
| 2,628,274 | 2/53 | Homrighous | 178—6.8 X |

DAVID G. REDINBAUGH, *Primary Examiner.*

NEWTON N. LOVEWELL, STEPHEN W. CAPELLI, *Examiners.*